United States Patent
Matsumoto et al.

(10) Patent No.: US 10,399,871 B2
(45) Date of Patent: Sep. 3, 2019

(54) ELECTROLYSIS APPARATUS AND WATER TREATMENT METHOD

(71) Applicant: KURITA WATER INDUSTRIES LTD., Tokyo (JP)

(72) Inventors: Yukitaka Matsumoto, Tokyo (JP); Hideki Kobayashi, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 0 days.

(21) Appl. No.: 15/577,575

(22) PCT Filed: Jun. 11, 2015

(86) PCT No.: PCT/JP2015/066856
§ 371 (c)(1),
(2) Date: Nov. 28, 2017

(87) PCT Pub. No.: WO2016/199269
PCT Pub. Date: Dec. 15, 2016

(65) Prior Publication Data
US 2018/0162754 A1 Jun. 14, 2018

(51) Int. Cl.
| | | |
|---|---|---|
| *C02F 1/46* | (2006.01) | |
| *C02F 1/461* | (2006.01) | |
| *C02F 1/467* | (2006.01) | |
| *C02F 1/02* | (2006.01) | |
| *C02F 101/30* | (2006.01) | |

(52) U.S. Cl.
CPC ........ *C02F 1/46109* (2013.01); *C02F 1/4672* (2013.01); *C02F 1/46104* (2013.01);
(Continued)

(58) Field of Classification Search
CPC .............. C02F 1/46109; C02F 1/46104; C02F 1/4672; C02F 1/025; C02F 2101/30;
(Continued)

(56) References Cited

U.S. PATENT DOCUMENTS

| | | | |
|---|---|---|---|
| 3,476,675 A | 11/1969 | Colvin et al. | |
| 4,676,882 A * | 6/1987 | Okazaki | B01J 47/08 204/260 |

(Continued)

FOREIGN PATENT DOCUMENTS

| | | |
|---|---|---|
| EP | 2 597 070 A1 | 5/2013 |
| JP | H10-323672 A | 12/1998 |

(Continued)

OTHER PUBLICATIONS

PCT/ISA/210, "International Search Report for International Application No. PCT/JP2015/066856," dated Aug. 18, 2015.
(Continued)

*Primary Examiner* — Arun S Phasge
(74) *Attorney, Agent, or Firm* — Manabu Kanesaka

(57) ABSTRACT

Provided is an electrolysis apparatus with which the liquid that is to be treated can be continuously electrolyzed with high efficiency under high-temperature and high-pressure conditions. The electrolysis apparatus includes a cylindrical container main body including an inner peripheral surface serving as a cathode surface, an anode plate disposed in the container main body along an axis thereof, and end members attached to the respective ends of the container main body with nuts interposed therebetween, respectively. The end members are provided with nozzles, respectively, through which the liquid is passed. The end member is provided with a power supply rod connected to the anode plate which is inserted in the end member. Bipolar electrode plates are disposed in the container main body so as to be parallel to the anode plate. Insulators support the sides of the anode plate and the sides of the bipolar electrode plates.

9 Claims, 14 Drawing Sheets

(52) U.S. Cl.
CPC .... *C02F 1/025* (2013.01); *C02F 2001/46128* (2013.01); *C02F 2001/46147* (2013.01); *C02F 2001/46152* (2013.01); *C02F 2001/46171* (2013.01); *C02F 2101/30* (2013.01); *C02F 2201/4611* (2013.01); *C02F 2301/066* (2013.01)

(58) Field of Classification Search
CPC .. C02F 2001/46171; C02F 2001/46147; C02F 2001/46128; C02F 2001/46152
See application file for complete search history.

(56) References Cited

U.S. PATENT DOCUMENTS

| | | |
|---|---|---|
| 5,254,226 A | 10/1993 | Williams et al. |
| 5,443,700 A * | 8/1995 | Hirose ............... C02F 1/46114 204/233 |
| 5,902,465 A | 5/1999 | Pang |
| 6,939,458 B1 | 9/2005 | Nishimura et al. |

FOREIGN PATENT DOCUMENTS

| | | |
|---|---|---|
| JP | H11-276879 A | 10/1999 |
| JP | 2000-233186 A | 8/2000 |
| JP | 2003-175389 A | 6/2003 |
| JP | 2004-237165 A | 8/2004 |
| JP | 2004-298670 A | 10/2004 |
| JP | 3970458 B2 | 9/2007 |
| JP | 4002358 B2 | 10/2007 |
| JP | 2009-215578 A | 9/2009 |
| JP | 2012-035175 A | 2/2012 |

OTHER PUBLICATIONS

Europe Patent Office, "Search Report for European Patent Application No. 15894954.5," dated Nov. 16, 2018.

* cited by examiner

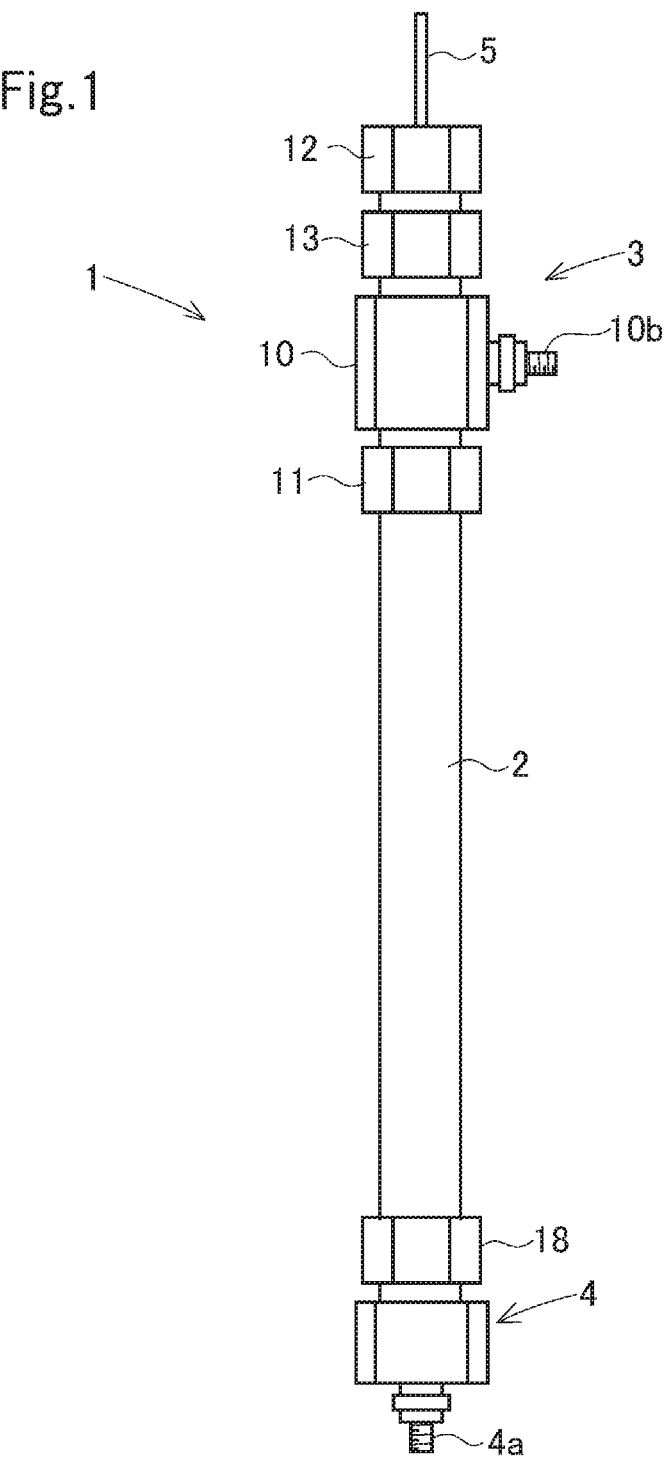

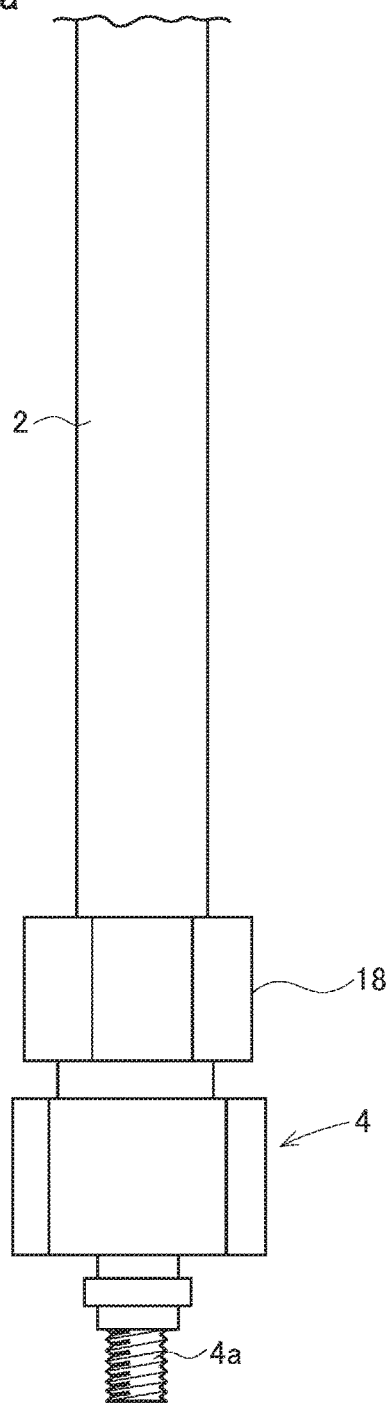
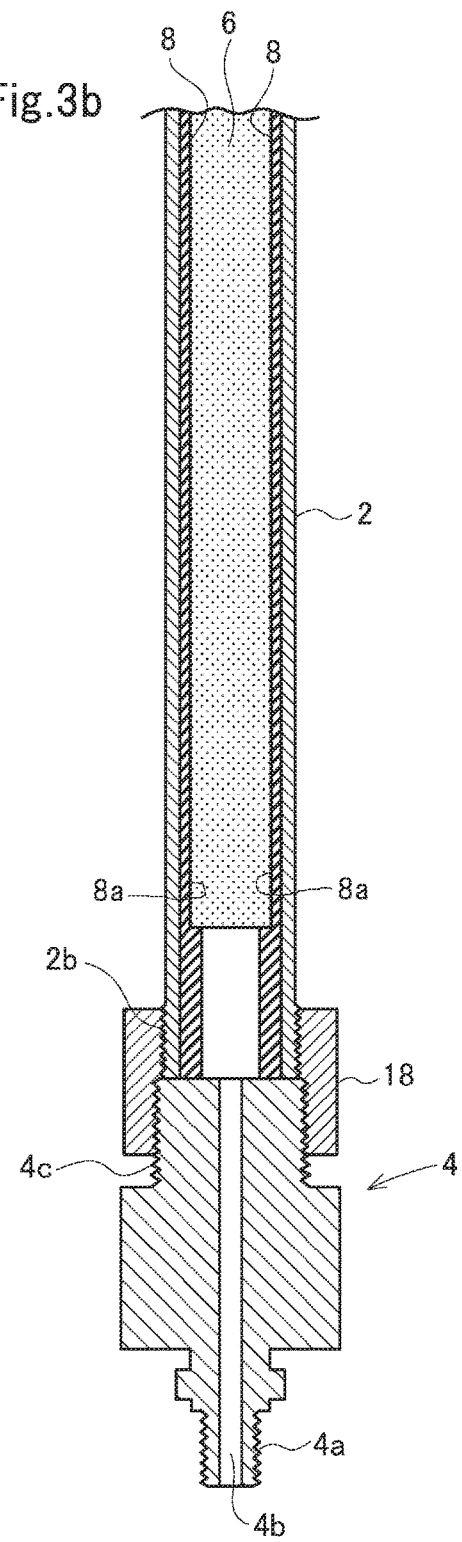

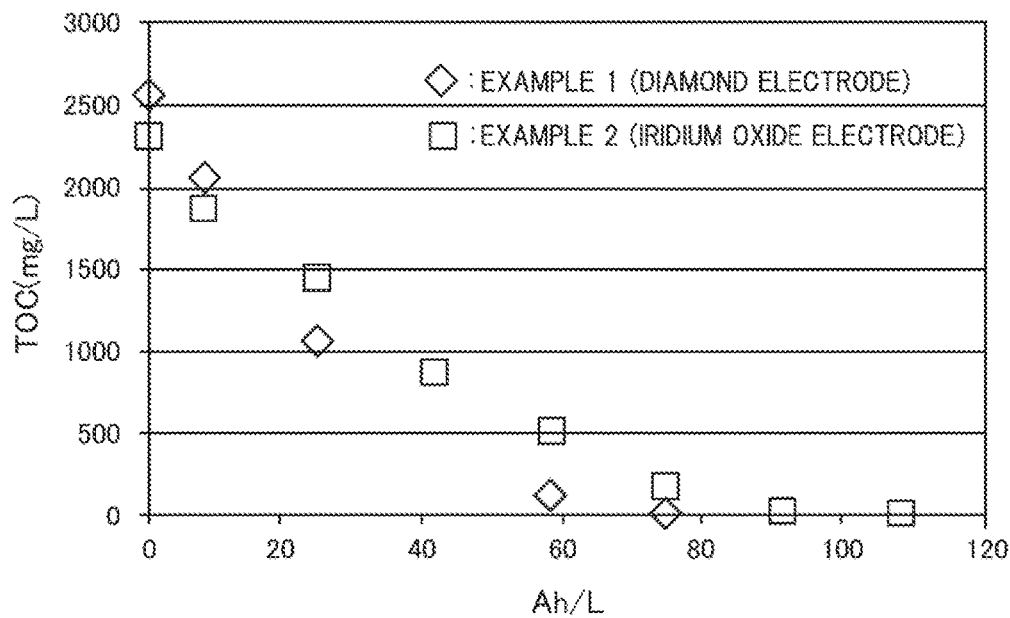
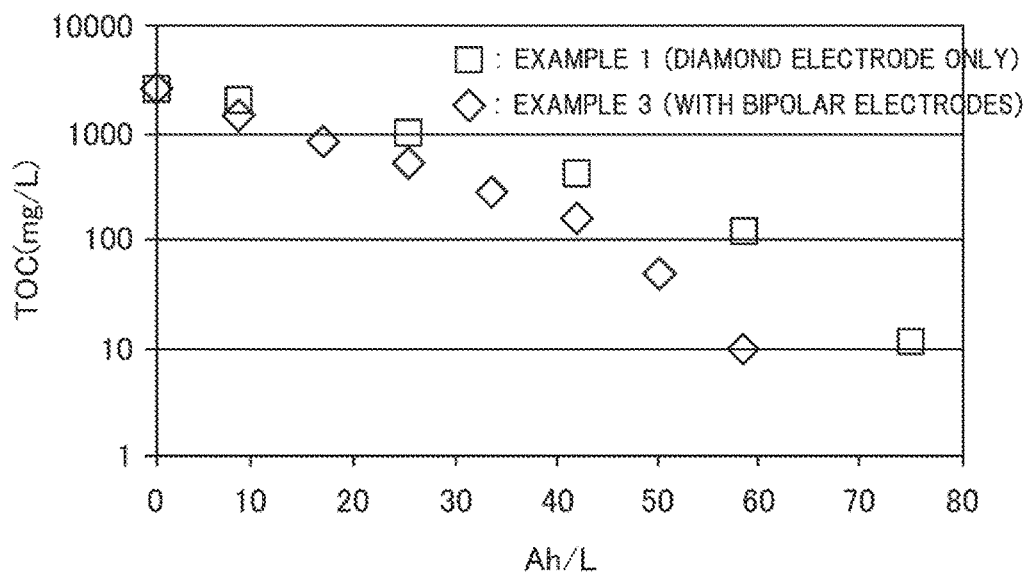

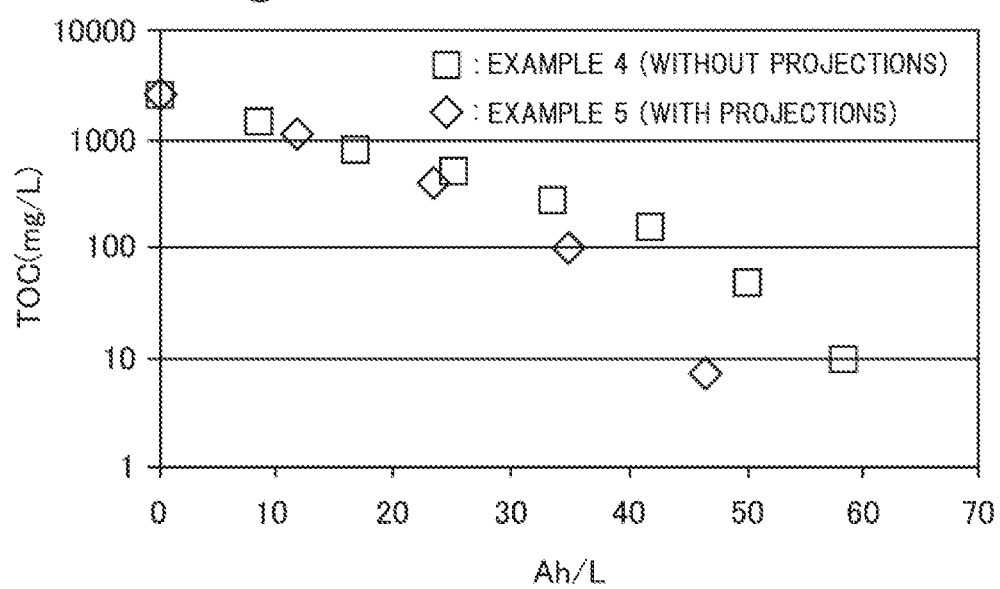

ELECTROLYSIS APPARATUS AND WATER TREATMENT METHOD

TECHNICAL FIELD

The present invention relates to an apparatus and method for electrolyzing reducing substances contained in water under high-temperature and high-pressure conditions. The present invention relates specifically to the electrolysis apparatus with which a liquid that is to be treated and contains reducing substances, such as organic substances and ammonia (e.g., organic liquid waste and various types of industrial liquid waste that contain halide ions) can be continuously electrolyzed with a high current efficiency. The present invention further relates to the water treatment method in which the electrolysis apparatus is used.

BACKGROUND ART

Hydrothermal electrolysis apparatuses that oxidatively decompose reducing substances, such as organic substances (including synthetic polymers) and ammonia, by performing electrolysis under high-temperature and high-pressure conditions to cause hydrothermal reaction simultaneously are known (Patent Literature (PTL) 1 to PTL 3).

When electrolysis is performed with such an electrolysis apparatus, the temperature and pressure inside the reactor are increased. Therefore, the treatment of a liquid waste may be performed by a batch treatment or by a quasi-continuous treatment in which a batch treatment is repeatedly performed. However, it is difficult to treat a large amount of liquid waste by a batch treatment or a quasi-continuous treatment, because the amount of liquid waste that can be treated by one batch treatment or one quasi-continuous treatment is small.

PTL 3 proposes a hydrothermal electrolysis apparatus including cylindrical metal electrodes which is capable of continuously treating a large amount of wastewater. The hydrothermal electrolysis apparatus proposed in PTL 3 includes a cylindrical reactor, a flanged lid with which the cylindrical reactor is hermetically sealed, and a number of cylindrical metal electrodes disposed in the reactor which serve as internal electrodes.

The hydrothermal electrolysis apparatus proposed in PTL 3 has the following disadvantages.

i) Since a number of cylindrical metal electrodes are disposed in the reactor, the reactor is required to have a large inside diameter.

ii) The reactor is hermetically sealed with a flanged lid having a larger diameter than the reactor. This increases the size and weight of the apparatus.

iii) The reactor included in the apparatus needs to have a large thickness in order to enhance the pressure resistance of the apparatus. An increase in the thickness of the reactor leads to an increase in the heat capacity of the reactor, and the amount of energy required for heating the reactor is increased accordingly. The flanged portion, which is formed in the lid as described above, also has a large heat capacity. Therefore, a large amount of energy is required for performing heating in the initial stage.

iv) Since the flanged portion is formed in the lid, the surface area of the apparatus is increased accordingly. This also increases the amount of heat lost by heat dissipation.

v) In common electrolysis reactions, decomposition of water involves formation of bubbles. Although the formation of bubbles is suppressed when electrolysis is performed under high-temperature, high-pressure conditions, it is not possible to prevent the formation of bubbles. If bubbles are adhered to the surfaces of the electrodes, the contact efficiency between the liquid that is to be treated and the electrodes may be reduced, which results in, for example, a reduction in the reaction efficiency or an increase in the electrolysis voltage. Although the bubbles can be washed away and removed by increasing the flow rate of the liquid that is to be treated, it is difficult to remove bubbles adhered on the surfaces of the electrodes because, in the structure employed in PTL 3, channels have a large cross-sectional area and the velocity (linear velocity) at which the liquid flows along the surfaces of the electrodes is low even when the flow rate of the liquid is high.

vi) Since the electrolysis apparatus includes metal electrodes, the efficiency with which organic substances are electrolyzed is low.

vii) When metal electrodes are used, it is not possible to employ a bipolar structure under high-temperature, high-pressure conditions, and increasing the area of internal electrodes included in one cylindrical tube requires installing cathodes and anodes separately. This increases the complexity of the structure.

Electrolysis apparatuses used for performing electrolysis which include a bipolar electrode in order to simplify wiring and increase the current efficiency are known (PTL 4). In PTL 4, one or plural bipolar electrodes are interposed between an anode and a cathode so as to be parallel to the anode and the cathode. Upon a voltage being applied between the anode and the cathode, polarization occurs in the bipolar electrodes, which are not connected to a power source. This contributes to electrolysis. It is described in PTL 4 that conductive diamond electrodes are used as an anode, a cathode, and bipolar electrodes. Conductive diamond electrodes are electrodes including diamond doped with boron or nitrogen so as to have electrical conductivity. Self-supported conductive diamond electrodes produced by forming conductive diamond on a substrate and subsequently removing the substrate and conductive diamond electrodes produced by forming a conductive diamond film on a substrate composed of silicon or the like are used.

PTL 1: Japanese Patent No. 3970458
PTL 2: Japanese Patent No. 4002358
PTL 3: JP 2000-233186 A
PTL 4: JP 2004-237165 A

SUMMARY OF INVENTION

An object of the present invention is to address the above-described issues of the related art and to provide an electrolysis apparatus with which the liquid to be treated can be continuously electrolyzed with high efficiency under high-temperature and high-pressure conditions and a water treatment method in which the electrolysis apparatus is used.

The electrolysis apparatus of the present invention comprises a cylindrical container main body including an inner peripheral surface serving as a cathode surface; an anode plate disposed in the container main body along an axis of the container main body; and end members attached to the respective ends of the container main body by being screwed. Each of the end members has a hole formed therein through which a liquid is passed. One of the end members is provided with a power supply rod inserted therein. The power supply rod is connected to the anode plate.

According to an embodiment of the present invention, the end members are each connected to the container main body with a cylindrical joint having an internal thread.

According to an embodiment of the present invention, bipolar electrode plates are disposed in the container main body so as to be parallel to the anode plate. The electrolysis apparatus preferably includes an insulator that supports a side of the anode plate and a side of the bipolar electrode plate, the insulator extending along the inner peripheral surface of the container main body.

It is preferable that the insulator include an outer peripheral surface that faces the inner peripheral surface of the container main body and an electrode-facing surface located on a side of the insulator which is opposite to the side on which the outer peripheral surface is located and the electrode-facing surface have a groove formed therein in which an edge of the side of the anode plate and an edge of the side of the bipolar electrode plate are fit.

According to an embodiment of the present invention, a pair of the insulators are arranged along the respective sides of the anode plate and the respective sides of the bipolar electrode plate. It is preferable that each of the insulators include projections protruded toward upper edges of the anode plate and the bipolar electrode plate and lower edges of the anode plate and the bipolar electrode plate, respectively, each of the projections have a groove formed therein in which upper or lower edges of the anode plate and the bipolar electrode plate are fit, the grooves being used for supporting electrodes, and each of the projections have a channel formed therein which vertically penetrates through the projection. The channel is preferably a grooved channel communicated with the groove used for supporting electrodes. The projections of one of the pair of the insulators are preferably each in contact with a corresponding one of the projections of the other of the pair of the insulators.

The channel is preferably a grooved channel communicated with the groove used for supporting electrodes.

A water treatment method according to the present invention is a method in which the treatment of the liquid that is to be treated is performed using the above-described electrolysis apparatus according to the present invention.

According to an embodiment of the water treatment method of the present invention, wastewater is passed upwardly through the electrolysis apparatus, and a voltage is applied between the anode plate and the container main body in order to heat the wastewater by Joule's heat in the container main body and oxidatively decompose a reducing substance contained in the wastewater on a surface of the anode plate and, when the electrolysis apparatus includes the bipolar electrode plate, also on a surface of the bipolar electrode plate.

Advantageous Effects of Invention

According to the present invention, the following advantageous effects may be achieved.

1) Since the container main body is sealed with the end members screwed in the container main body instead of a flanged lid, a once-through channel for the liquid to be treated is formed. This enables the cross-sectional area of channels to be reduced. Accordingly, the velocity at which the liquid flows along the surfaces of the electrodes can be increased, and bubbles can be removed from the surfaces of the electrodes. This increases the efficiency of the decomposition reaction on the surface of the electrodes.

2) The electrolysis apparatus does not include a large-thickness, large-size reactor or a member such as a flanged lid. This reduces the amount of energy lost during heating and the amount of energy lost due to heat dissipation.

3) The electrolysis apparatus includes an insulator that insulates the internal electrodes from the container main body. This enables control of the flow of current and reduces the risk of a current being diverted from the electrodes and directly passed into the container main body, which is referred to as "short path". As a result, the electrolysis efficiency can be increased. Furthermore, the insulator supports the electrode plates and enables the electrode plates to be consistently arranged at predetermined intervals.

4) The bipolar electrode plates are disposed in the container main body so as to be parallel to the anode plate. This increases the area of the electrodes per volume and, consequently, the electrolysis efficiency.

5) The anode plate is made of a metal and integrated with the power supply rod into one component. This reduces the contact resistance of a power supply unit. In this case, also, the insulator disposed in the periphery of the electrodes enables control of the flow of current, reduces the risk of a current being diverted from the electrodes, and increases the electrolysis efficiency.

6) Using tabular diamond electrodes increases the electrolysis efficiency, because the conductive diamond electrodes are markedly stable chemically and electrically and have a wide potential window, which allows various types of oxidizers to be generated by electrolysis.

According to the present invention, it is possible to continuously electrolyze, under high-temperature and high-pressure conditions with high efficiency, the liquid that is to be treated. It is possible to reduce the amounts of types of energy required by electrolysis which are other than electric power, such as energy required for heating the apparatus and force required for driving a pump with which the liquid is fed to the apparatus. This reduces the amount of energy required by the entire system.

BRIEF DESCRIPTION OF DRAWINGS

FIG. 1 is a side view of an electrolysis apparatus according to an embodiment.

FIG. 3a is an enlarged view of the lower part of the electrolysis apparatus illustrated in FIG. 1. FIG. 3b is a longitudinal cross-sectional view of the lower part of the electrolysis apparatus.

FIG. 7a is a front view of the insulator. FIG. 7b is a right-side view of the insulator. FIG. 7c is a cross-sectional view of the insulator which is taken along the line VIIc-VIIc illustrated in FIG. 7a.

FIG. 19 is a graph illustrating the results obtained in Examples 1 and 2.

FIG. 20 is a graph illustrating the results obtained in Examples 1 and 3.

FIG. 21 is a graph illustrating the results obtained in Examples 4 and 5.

DESCRIPTION OF EMBODIMENTS

Figure 2A:
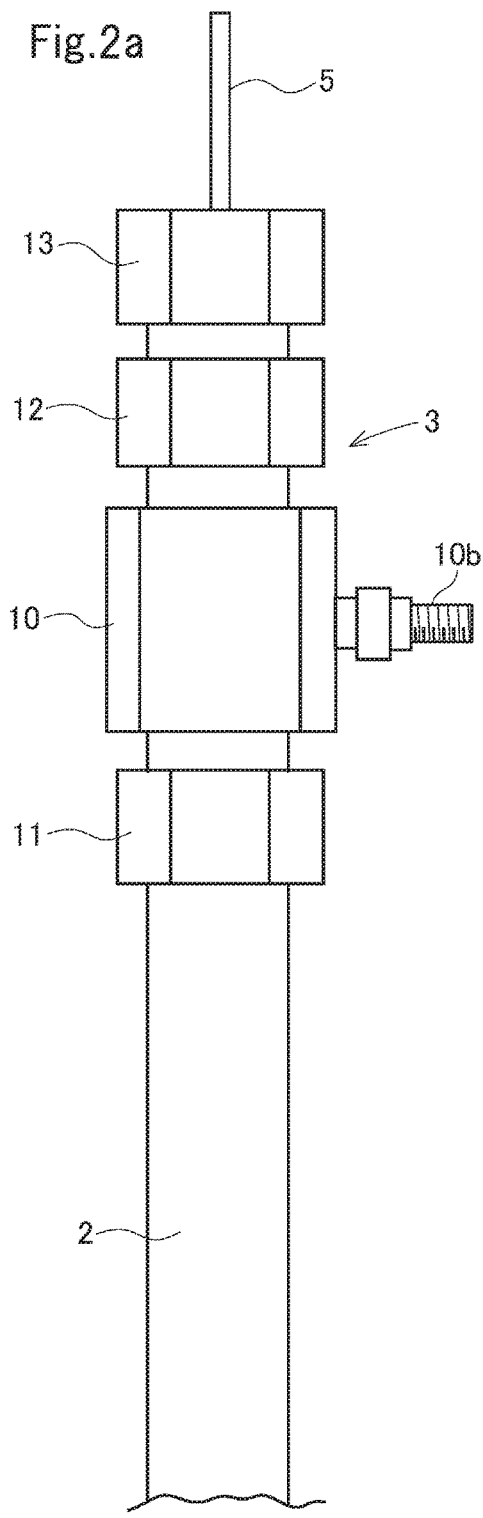
FIG. 2a is an enlarged view of the upper part of the electrolysis apparatus illustrated in FIG. 1.

Electrolysis apparatuses and water treatment methods according to embodiments of the present invention are described below with reference to the attached drawings. The present invention is not limited by the following embodiments without departing from the scope of the invention.

FIGS. 1 to 5 illustrate an electrolysis apparatus according to a first embodiment. An electrolysis apparatus 1 includes a cylindrical container main body 2 arranged such that an axial direction thereof is vertically oriented; an upper-end member 3 attached to the upper part of the container main body 2; a lower-end member 4 attached to the lower part of the container main body 2; a power supply rod 5 inserted in the container main body 2 so as to penetrate through the upper-end member 3 at the axis position of the container main body 2; an anode plate 6 connected to the lower end of the power supply rod 5; bipolar electrode plates 7 arranged parallel to the anode plate 6; insulators 8 composed of an electrically insulating material which supports the sides of the anode plate 6 and the sides of the bipolar electrode plates 7; and the like.

In this embodiment, the container main body 2 serves as a cathode. The inside diameter of the cylindrical container main body 2 is preferably 6 to 50 mm and is particularly preferably 10 to 30 mm. The length of the container main body 2 is preferably 1 to 100 times and is particularly preferably 5 to 20 times the inside diameter of the container main body 2.

The upper-end member 3 and the lower-end member 4 are attached to the respective ends of the container main body 2 with cylindrical joints, that is, nuts 11 and 18, respectively.

Figure 2B:
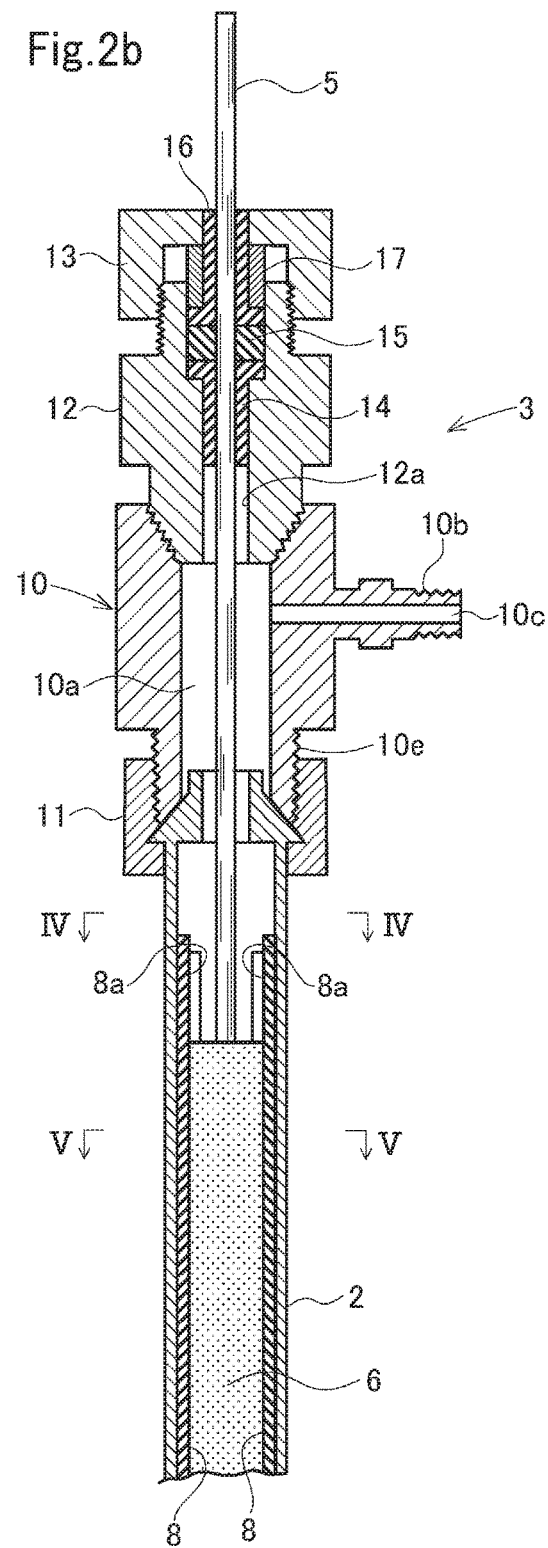
FIG. 2b is a longitudinal cross-sectional view of the upper part of the electrolysis apparatus.
Figure 4:
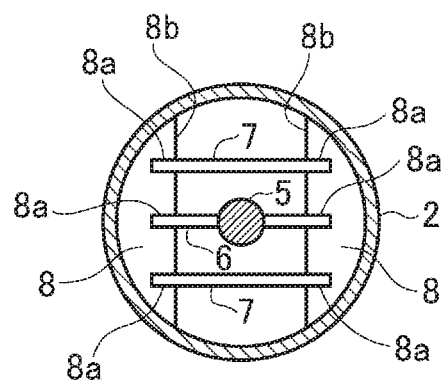
FIG. 4 is a cross-sectional view of the upper part of the electrolysis apparatus illustrated in FIG. 2b which is taken along the line IV-IV.
Figure 5:
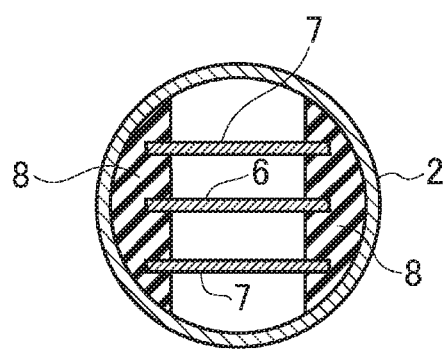
FIG. 5 is a cross-sectional view of the upper part of the electrolysis apparatus illustrated in FIG. 2b which is taken along the line V-V.

As illustrated in FIGS. 2a and 2b, the upper-end member 3 includes a socket 10, a union nut 11 with which the lower part of the socket 10 is joined to the container main body 2, and a plug 12 screwed into the upper part of the socket 10. The socket 10 has a hole 10a having a large diameter which is formed therein. The socket 10 is provided with a nozzle 10b protruded laterally. The nozzle 10b has a nozzle hole 10c, which communicates with the socket hole 10a. The nozzle hole 10c serves as an outlet for an electrolyzed liquid. The inside diameter of the socket hole 10a is substantially equal to that of the container main body 2. The socket hole 10a and the container main body 2 are coaxial.

The socket 10 has a through-hole 10d formed in the upper part thereof. The through-hole 10d penetrates through the socket 10 so as to extend from the hole 10a to the upper surface of the socket 10 along the axis of the socket 10. The union nut 11 is screwed with an external thread 10e formed in the lower part of the socket 10. The plug 12 is screwed in the upper part of the socket 10. A union nut 13 is screwed with the upper part of the plug 12.

The plug 12 has a through-hole 12a formed therein. The power supply rod 5 is inserted in the through-hole 12a and the union nut 13. A packing 15 composed of a rubber, a fluororesin, PEEK, or the like, insulating members 14 and 16 composed of a fluororesin, PEEK, a ceramic, or the like, and a follower 17 composed of a metal, such as SUS, are interposed between the inner peripheral surface of the through-hole 12a and the outer peripheral surface of the power supply rod 5. The follower 17 is cylindrical and fit onto the insulating member 16. The insulating member 16 extends to the inner peripheral surface of the union nut 13.

As illustrated in FIGS. 3a and 3b, the lower-end member 4 is provided with a nozzle 4a protruded downwardly along the axis of the lower-end member 4. The nozzle 4a has a nozzle hole 4b penetrating therethrough so as to extend from the end (lower end) of the nozzle 4a to the upper surface of the lower-end member 4. The nozzle hole 4b serves as an inlet for the liquid that is to be treated. The lower-end member 4 is joined to the lower end of the container main body 2 with a nut 18. The nut 18 is screwed with an external thread 2b formed in the container main body 2 and an external thread 4c formed in the outer peripheral surface of the upper part of the lower-end member 4.

The anode plate 6 and the bipolar electrode plates 7 have a rectangular, slender, and tabular shape and disposed in the container main body 2 so as to extend from the upper part to the lower part of the container main body 2. The anode plate 6 and the bipolar electrode plates 7 are arranged at certain intervals such that the surfaces of the plates are parallel to one another. The anode plate 6 is arranged along the axis of the container main body 2. While one bipolar electrode plate 7 is disposed on each side of the anode plate 6 in this embodiment, plural bipolar electrode plates 7 may be disposed on each side of the anode plate 6.

The left- and right-sides (vertical sides) of the anode plate 6 and the bipolar electrode plates 7 are supported by a pair of the insulators 8 and 8 composed of an rubber, a synthetic resin, a ceramic, or the like that is electrically insulative. The insulators 8 are columnar members that have an arc-like outer peripheral surface, a planar electrode-facing surface 8b, and a chord-like horizontal cross section. The outer peripheral surfaces of the insulators 8 are in close contact with the inner peripheral surface of the cylindrical container main body 2. The electrode-facing surfaces 8b of the insulators 8 extend in the chord direction of the inner peripheral surface of the container main body 2.

Each of the electrode-facing surfaces 8b has grooves 8a that are formed therein and extend in the vertical direction. In this embodiment, the number of the grooves 8a is three. In this embodiment, the lower ends of the grooves 8a are placed a predetermined distance away from the lower ends of the insulators 8 in the upward direction. As illustrated in FIG. 3b, the anode plate 6 and the bipolar electrode plates 7 are locked in the lower ends of the grooves 8a so as not to slip down.

Using the insulators 8 enables the anode plate 6 and the bipolar electrode plates 7 to be fixedly held at predetermined positions inside the container main body 2 and to be arranged at regular intervals. In addition, the likelihood of the anode plate 6 and the bipolar electrode plates 7 coming into contact with the inner peripheral surface of the container main body 2 can be eliminated with certainty. Arranging the insulators 8 in the peripheries of the anode plate 6 and the bipolar electrode plates 7 enables the control of flow of a current and eliminates the risk of a current being diverted from the electrodes. This increases the current efficiency.

In the case where the anode plate 6 is made of a metal, the anode plate 6 and the power supply rod 5 may be integrated with each other into a single component. In such a case, the contact resistance between the power supply rod 5 and the anode plate 6 can be reduced and, consequently, the electrolysis voltage may be further reduced.

The surface of the power supply rod 5, which is made of a metal, may be coated with iridium oxide or a noble metal, such as platinum. Coating the surface of the power supply rod 5 with an electrically insulating material or covering the surface of the power supply rod 5 with an insulating tube, such as a PEEK shrinkable tube, increases the efficiency with which power is supplied to the anode plate 6.

The treatment of a liquid that is to be treated (wastewater) can be performed using the electrolysis apparatus 1 in the following manner. The wastewater is passed upwardly through the electrolysis apparatus 1. A voltage is applied between the anode plate 6 and the container main body 2, which serves also as a cathode. The wastewater is pressurized with a high-pressure pump (not illustrated) and introduced to the container main body 2 through the nozzle 4a. The wastewater may be preheated with a heat exchanger or the like.

The wastewater is heated by Joule's heat in the container main body 2, while reducing substances contained in the wastewater are oxidatively decomposed on the surfaces of the anode plate 6 and the bipolar electrode plates 7. Since the bipolar electrode plates 7 are interposed between the anode plate 6 and the container main body 2, which serves as a cathode, so as to be parallel to the anode plate 6, an electric field is generated in a direction substantially perpendicular to the surfaces of the bipolar electrode plates 7. Consequently, surfaces of the bipolar electrode plates 7 which face the anode plate 6 serve as a cathode surface, and the other surfaces of the bipolar electrode plates 7, that is, surfaces of the bipolar electrode plates 7 which face the inner peripheral surface of the container main body 2, serve as an anode surface. The oxidation reaction occurs also on the anode surfaces of the bipolar electrode plates 7. The water treated in the above-described manner is discharged through the nozzle 10b. The treated water may be returned to the electrolysis apparatus 1 in a circulatory manner.

Figure 6:
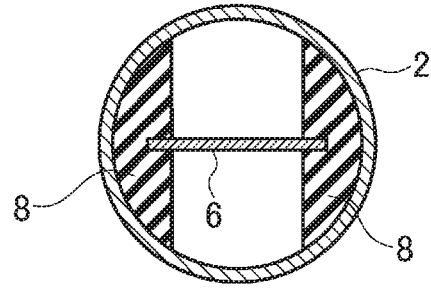
FIG. 6 is a horizontal cross-sectional view of an electrolysis apparatus according to a second embodiment.

While the electrolysis apparatus 1 according to the first embodiment includes the bipolar electrode plates 7, the bipolar electrode plates 7 may be omitted as in the second embodiment illustrated in FIG. 6. That is, the electrolysis apparatus 1 may include only the anode plate 6. Using the bipolar electrode plates 7 increases the area of surfaces of electrodes which contribute to the oxidation reaction and the treatment efficiency.

While the total number of the bipolar electrode plates 7 interposed between the anode plate 6 and the container main body 2 (cathode) is two in the first embodiment, the number of the bipolar electrode plates may be more than two. The size of the bipolar electrode plates 7 is preferably substantially the same as that of the anode plate 6.

While the insulators support only the sides of the anode plate 6 and the bipolar electrode plates 7 in the first embodiment, the insulators may have projections protruded toward the upper and lower parts of the anode plate 6 and the bipolar electrode plates 7 and support also the upper and lower edges of the anode plate 6 and the bipolar electrode plates 7 with the projections.

Such an insulator 20 and an electrolysis apparatus according to a third embodiment which includes the insulator 20 are described below with reference to FIGS. 7a to 18.

FIGS. 7a to 11 illustrate an insulator 20 having projections. The insulator 20 is a columnar member including an arc-like outer peripheral surface 20f and an electrode-facing surface 20e located on a side of the insulator 20 which is opposite to the side on which the arc-like outer peripheral surface 20f is located. The arc-like outer peripheral surface 20f and the electrode-facing surface 20e extend along the inner peripheral surface of the container main body 2 as in the insulator 8. The insulator 20 also has projections 21 and 22 formed in the upper and lower parts thereof, respectively.

Figure 14:
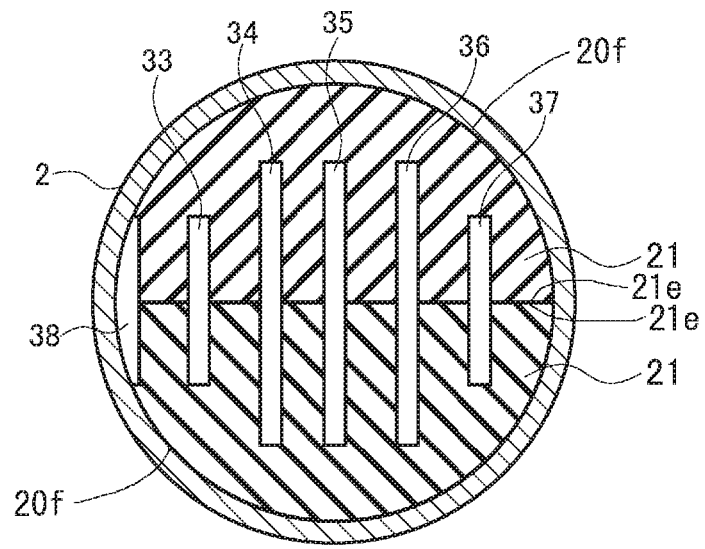
FIG. 14 is a cross-sectional view of the electrolysis apparatus which is taken along the line XIV-XIV illustrated in FIG. 13.
Figure 15:
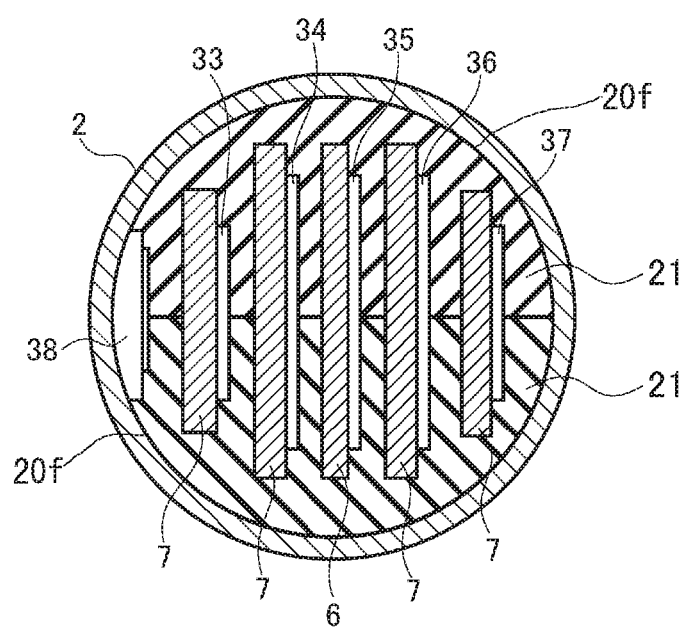
FIG. 15 is a cross-sectional view of the electrolysis apparatus which is taken along the line XV-XV illustrated in FIG. 13.
Figure 16:
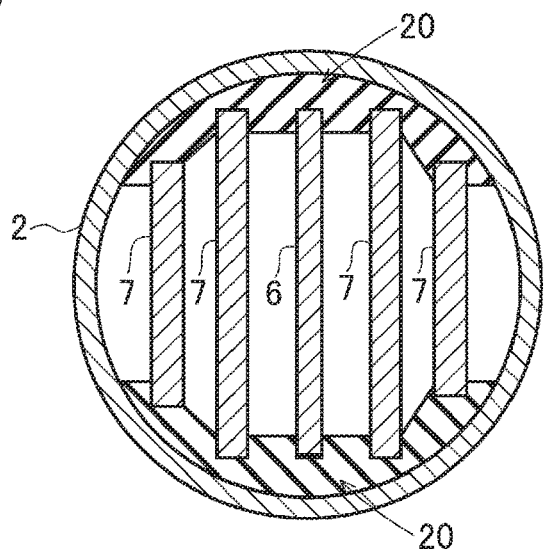
FIG. 16 is a cross-sectional view of the electrolysis apparatus which is taken along the line XVI-XVI illustrated in FIG. 13.
Figure 17:
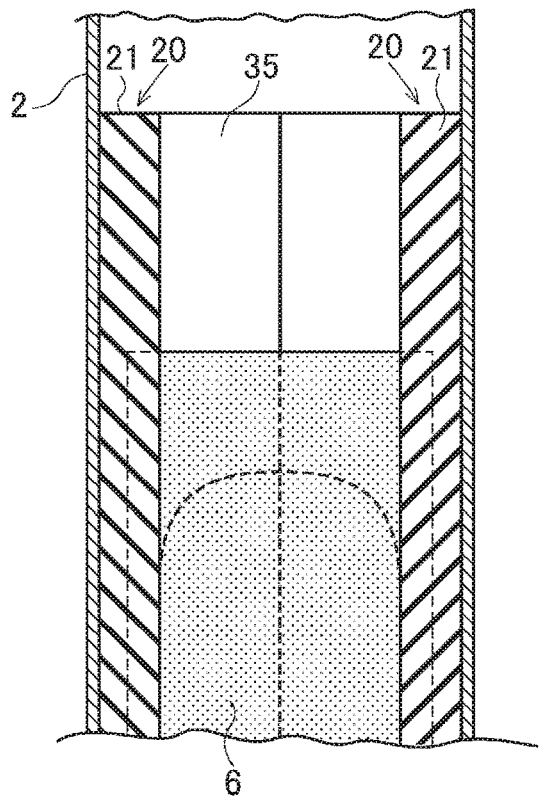
FIG. 17 is a cross-sectional view of the electrolysis apparatus which is taken along the line XVII-XVII illustrated in FIG. 13.
Figure 18:
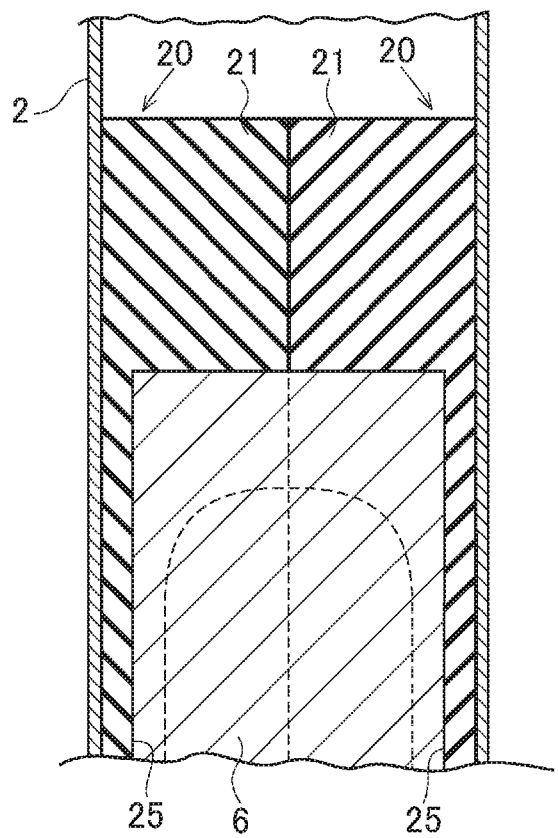
FIG. 18 is a cross-sectional view of the electrolysis apparatus which is taken along the line XVIII-XVIII illustrated in FIG. 13.

The projections 21 and 22 have a semicircular horizontal cross section. When the electrode-facing surfaces 20e of a pair of the insulators 20 and 20 are faced with each other such that the projections 21 of the insulators 20 and 20 come into contact with each other and the projections 22 of the insulators 20 and 20 come into contact with each other, the outer peripheral surfaces 20f of the projections 21 and 22 form a cylindrical plane as illustrated in FIGS. 14 and 15. The diameter of the cylindrical plane is substantially equal to the inside diameter of the container main body 2.

The insulator 20 has five grooves used for supporting the electrodes, that is, grooves 23 to 27, which are formed in the electrode-facing surface 20e at regular intervals and extend from the upper projection 21 to the lower projection 22. Among the five grooves 23 to 27, the anode plate 6 is attached to the groove 25 located at the center in the width direction, and the bipolar electrode plates 7 are attached to the other grooves, that is, the grooves 23, 24, 26, and 27.

The projections 21 and 22 have grooved channels 33 to 37 and channels 43 to 47, respectively, through which water can be passed. The grooved channels 33 to 37 vertically penetrate through the projection 21. The grooved channels 43 to 47 vertically penetrate through the projection 22. The channels 33 to 37 of the projection 21 are superimposed on the upper ends of the grooves 23 to 27, respectively. The channels 43 to 47 of the projection 22 are superimposed on the lower ends of the grooves 23 to 27, respectively. The channels 33 to 37 and the channels 43 to 47 are arranged to be slightly shifted from the respective grooves 23 to 27 such that the channels 33 to 37 vertically penetrate through the projection 21 and the channels 43 to 47 vertically penetrate through the projection 22 even when the anode plate 6 and the bipolar electrode plates 7 are attached to the grooves 23 to 27.

The projections 21 and 22 have notched channels 38 and 48, respectively, formed in the sides of the projections 21 and 22.

As illustrated in FIGS. 12b and 12c, a pair of the insulators 20 and 20 support the anode plate 6 and the bipolar electrode plates 7 and are disposed in the container main body 2 such that the electrode-facing surfaces 21e of the projections 21 come into contact with each other and the electrode-facing surfaces 22e of the projections 22 come into contact with each other. The anode plate 6 is supported in position by the entire periphery thereof being fit in the groove 25. The bipolar electrode plates 7 are supported in position by the entire peripheries of the bipolar electrode plates 7 being fit in the grooves 23, 24, 26, and 27.

The other components of the electrolysis apparatus including the insulators 20 are the same as those of the electrolysis apparatus 1 according to the first embodiment.

Also in this electrolysis apparatus, wastewater is introduced through the nozzle 4a attached to the lower part of the electrolysis apparatus. The wastewater is passed through the electrolysis apparatus via the channels 43 to 48 upwardly along the anode plate 6 and the bipolar electrode plates 7. Reducing substances contained in the wastewater are oxidatively decomposed on the surfaces of the anode plate 6 and the bipolar electrode plates 7. The treated water is passed through the channels 33 to 38 and discharged through the nozzle 10b disposed in the upper part of the electrolysis apparatus.

In this embodiment, the upper and lower parts of the anode plate 6 and the bipolar electrode plates 7 are surrounded with the insulators 20. This prevents a current from being diverted over vertical or horizontal edges of the electrodes and increases the current efficiency.

Figure 13:
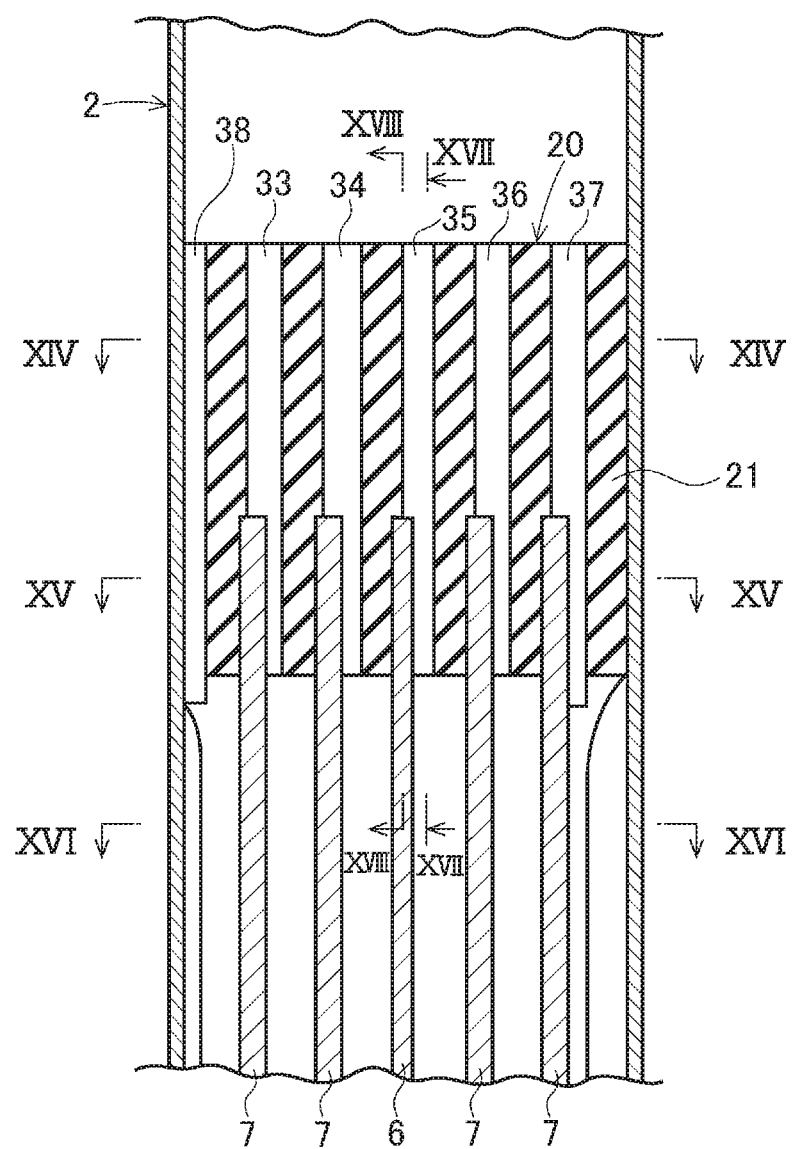
FIG. 13 is an enlarged view of the upper part of the cross section of the electrolysis apparatus illustrated in FIG. 12c.

Furthermore, as illustrated in FIGS. 13 and 15, the channels 33 to 37 and the channels 43 to 47 extend along the surfaces of the electrode plates (the anode plate 6 and the bipolar electrode plates 7). This increases the area of surfaces of the electrode plates which come into contact with the liquid at the upper and lower ends thereof.

While the channels used in this embodiment are grooved channels, they may be through-hole-like channels.

<Materials Constituting the Apparatus>

Examples of a material for the container main body 2, which serves as a cathode, include nickel-based alloys, such as Hastelloy and Incoloy; titanium-based alloys; and steels, such as carbon steel and stainless steel. The inner peripheral surface of the container main body 2 may be coated with a noble metal, such as platinum.

The inner peripheral surface of the container main body 2 may be coated with conductive diamond. Conductive diamond has high chemical stability, a high current efficiency, and a high electrolysis efficiency. In such a case, the container main body 2 may be produced by forming a coating layer composed of conductive diamond on a base material made of a metal, such as niobium, tungsten, stainless steel, molybdenum, platinum, or iridium.

At least the surface of the anode plate 6 is preferably composed of ruthenium, iridium, platinum, palladium, rhodium, tin, an oxide of any of the above metals, or ferrite. Alternatively, the entirety of the anode may be composed of any of the above substances. In another case, the surface of the base material constituting the anode may be coated with any of the above substances.

Ruthenium, iridium, platinum, palladium, rhodium, and tin that constitute the anode may be provided in the form of a metal element or an oxide. An alloy of any of the above metals may also be used as a material for the anode. Examples of the alloy include a platinum-iridium alloy, a ruthenium-tin alloy, and a ruthenium-titanium alloy. The above metals and the like have high corrosion resistance and are highly insoluble when used as a material for an anode.

The anode plate 6 may be a conductive diamond electrode for the same reasons as for the cathode. In such a case, the entirety of the anode plate 6 may be composed of conductive diamond. Alternatively, the anode plate 6 may be produced by forming a coating layer composed of conductive diamond on a base material composed of, for example, a metal such as silicon, niobium, tungsten, stainless steel, molybdenum, platinum, or iridium or a non-metal such as silicon carbide, silicon nitride, molybdenum carbide, or tungsten carbide. Because decomposition of TOC components occurs particularly on the anode, using a conductive diamond electrode as the anode plate 6 enables efficient decomposition of TOC components.

The entirety of the bipolar electrode plates 7 may be composed of conductive diamond. Alternatively, the bipolar electrode plates 7 may be each produced by forming a coating layer composed of conductive diamond on a base material composed of, for example, a metal such as silicon, niobium, tungsten, stainless steel, molybdenum, platinum, or iridium or a non-metal such as silicon carbide, silicon nitride, molybdenum carbide, or tungsten carbide.

The width of the anode plate 6 is preferably 20% to 90% and is particularly preferably 30% to 80% the inside diameter of the container main body 2. The length of the anode plate 6 is preferably about 20% to 100% and is particularly preferably about 40% to 90% the length of the container main body 2. The thickness of the anode plate 6 is preferably about 0.2 mm to 90% the inside diameter of the container main body 2 and is particularly preferably about 0.5 mm to 50% the inside diameter of the container main body 2.

As described above, the size of the bipolar electrode plates 7 is preferably substantially the same as the size of the anode plate 6.

<Liquid to be Treated>

The liquid to be treated, which is a liquid that can be treated in the present invention, is a liquid that contains a reducing substance that is oxidatively decomposable by electrolysis under high-temperature and high-pressure conditions. The reducing substance may be either an organic substance or an inorganic substance. In the case where the reducing substance is an organic substance, the TOC concentration in the liquid that is to be treated is preferably about 100 to 50000 mg/L and is particularly preferably about 1000 to 10000 mg/L.

Examples of reducing organic substances that can be electrolyzed in the present invention include aliphatic hydrocarbons and aromatic hydrocarbons, such as alkanes, alkenes, and alkynes; alcohols; aldehydes; ketones; amines; carboxylic acids, such as acetic acid; carboxylic acid derivatives, such as esters, amides, and acid anhydrides; halogenated hydrocarbons; phenols; and sulfur-containing organic compounds, such as sulfoxides, mercaptons, thiols, and polysulfones. The above reducing organic substances may be synthetic polymers. Examples of reducing inorganic substances that can be electrolyzed in the present invention include ammonia; a nitrate ion and a nitrite ion; cyanides, such as sodium cyanide; nitrogen compounds, such as urea; and sulfur compounds, such as hydrogen sulfide. The liquid to be treated may contain other ions, such as ions of inorganic acids and organic acids.

The liquid to be treated may be provided in the form of a suspension, an emulsion, or an aqueous solution. In other words, the reducing substance may be dissolved or dispersed in the liquid.

<Electrolysis Conditions>

The temperature at which treatment of the liquid that is to be treated is performed is set to be 100° C. or more and equal to or lower than the critical temperature of the liquid that is to be treated. The pressure at which treatment of the liquid that is to be treated is performed is set to be a pressure at which the liquid that is to be treated remains in a liquid phase in the above temperature range. Specifically, the temperature at which treatment of the liquid that is to be treated is performed is preferably 100° C. to 374° C. and is particularly preferably 200° C. to 250° C. The pressure at which treatment of the liquid that is to be treated is performed is preferably about 2 to 20 MPa and is particularly preferably about 5 to 10 MPa. Performing the electrolysis of the liquid that is to be treated at 200° C. or more increases the efficiency at which proteins and urea become decomposed.

The flow rate (linear velocity) at which the liquid to be treated is passed through the reactor is preferably 0.01 to 2 cm/sec and is particularly preferably 0.02 to 0.5 cm/sec. The water conduction SV is preferably about 1 to 100 $h^{-1}$ and is particularly preferably about 2 to 50 $h^{-1}$. The current density is preferably about 1 to 100 $A/dm^2$ and is particularly preferably about 2 to 50 $A/dm^2$.

EXAMPLES

The present invention is described in further detail with reference to Examples below. The present invention is not limited by Examples below.

Table 1 shows the qualities of each of wastewater (raw water) samples that contained persistent organic substances and were treated by electrolysis in Examples 1 to 5 below.

TABLE 1

|  | TOC | Na | $NH_4$ | K | Cl | $SO_4$ | $PO_4$ |
|---|---|---|---|---|---|---|---|
| Example 1 | 2580 | 5014 | 2320 | 1615 | 5869 | 1544 | 1887 |
| Example 2 | 2390 | 4365 | 2295 | 1756 | 4845 | 1293 | 1506 |
| Example 3 | 2470 | 4288 | 2585 | 1629 | 4731 | 1397 | 1511 |
| Example 4 | 2510 | 5029 | 2059 | 1782 | 5489 | 1705 | 1770 |
| Example 5 | 2470 | 4698 | 2294 | 1521 | 5301 | 1704 | 1779 |

Example 1

The raw water sample was electrolyzed with an electrolysis apparatus having the same structure as that illustrated in FIG. 6 except that the insulators were omitted, which included the anode plate 6 and did not include the bipolar electrode plates. The specifications of the electrolysis apparatus and the electrolysis conditions were set as follows.

<Specifications of Electrolysis Apparatus>

Container main body: Titanium container having an inside diameter of 8 mm, a length of 140 mm, and a side-wall thickness of 1 mm Anode plate: Tabular conductive diamond electrode having a width of 6 mm, a length of 120 mm, and a thickness of 0.8 mm <Electrolysis Conditions>

Temperature: 250° C.
Pressure: 7 MPa
Current density: 10 $A/dm^2$
Flow rate: 3 mL/min FIG. 19 illustrates the relationship between the amount of current input per liter of the raw water sample in the electrolysis treatment performed under the above conditions and the TOC concentration in the electrolyzed water.

Example 2

An electrolysis treatment was performed as in Example 1, except that an iridium oxide electrode having the same dimensions as in Example 1 was used as an anode plate. FIG. 19 illustrates the results.

As is clear from the results shown in FIG. 19, the amount of current required for reducing the TOC concentration to 10 mg/L or less was 75 Ah/L in the case where the diamond electrode was used and 108 Ah/L in the case where the iridium oxide electrode was used. That is, it was possible to decompose the organic substances using the diamond electrode with a current efficiency that is about 1.5 times the current efficiency with which the organic substances were decomposed using the iridium oxide electrode. This confirms that using a diamond electrode enables efficient treatment of wastewater containing organic substances.

Example 3

The electrolysis apparatus used in Example 2 was replaced with an electrolysis apparatus having the same structure as in FIGS. 1 to 5 except that the insulators were omitted, which included the anode plate 6 and the bipolar electrode plates 7. Specifically, the electrolysis apparatus used included an iridium oxide electrode serving an anode plate and two conductive diamond electrodes serving as bipolar electrodes, the conductive diamond electrodes having the same dimensions as the anode plate and being arranged on the respective sides of the iridium oxide electrode so as to be parallel to the anode plate at intervals of 1 mm. An electrolysis treatment was performed as in Example 2 except the above change was made. FIG. 20 illustrates the results. FIG. 20 also illustrates the results obtained in Example 1.

As is clear from the results shown in FIG. 20, the amount of current required for reducing the TOC concentration to 10 mg/L or less was 58 Ah/L in Example 3 where the electrolysis apparatus had a bipolar structure and 76 Ah/L in Example 1. This confirms that an electrolysis apparatus having the bipolar structure has an increased treatment capacity.

Example 4

An electrolysis apparatus having the structure illustrated in FIGS. 1 to 5 which is the same as that used in Example 3 except that the electrolysis apparatus included the insulators 8 was used. The insulators 8 were composed of a ceramic. An electrolysis treatment was performed as in Example 3 except the above change was made. FIG. 21 illustrates the results.

Example 5

Figure 7:
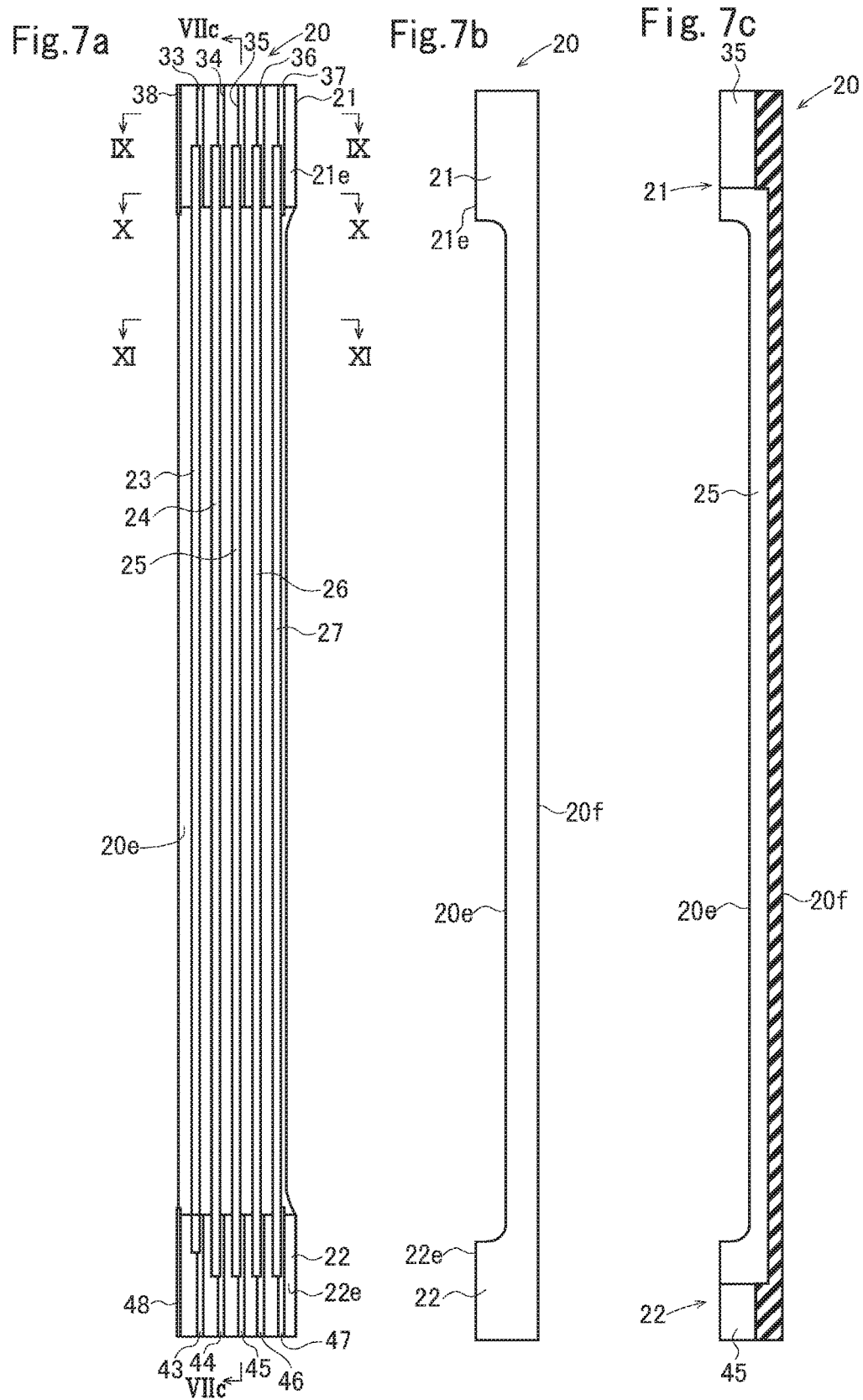
FIGS. 7a to 7c illustrate the structure of an insulator used in a third embodiment.
Figure 8:
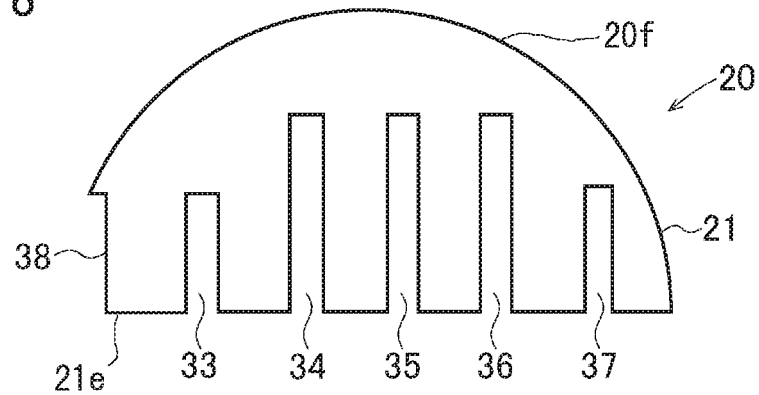
FIG. 8 is a plan view of the insulator illustrated in FIGS. 7a to 7c.
Figure 9:
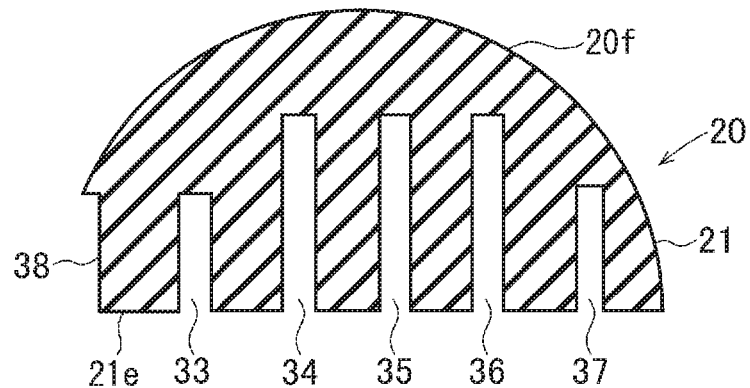
FIG. 9 is an end view of the insulator illustrated in FIG. 7a which is taken along the line IX-IX.
Figure 10:
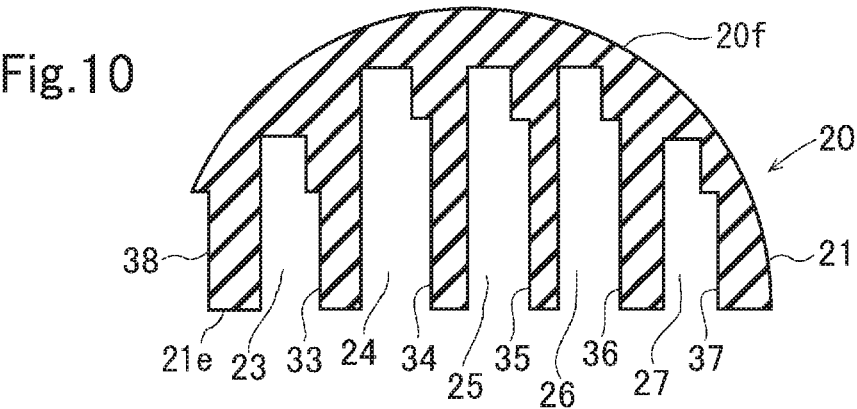
FIG. 10 is an end view of the insulator illustrated in FIG. 7a which is taken along the line X-X.
Figure 11:
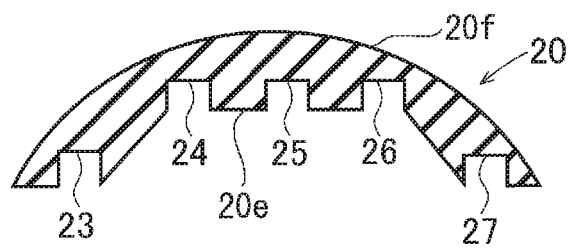
FIG. 11 is an end view of the insulator illustrated in FIG. 7a which is taken along the line XI-XI.
Figure 12:
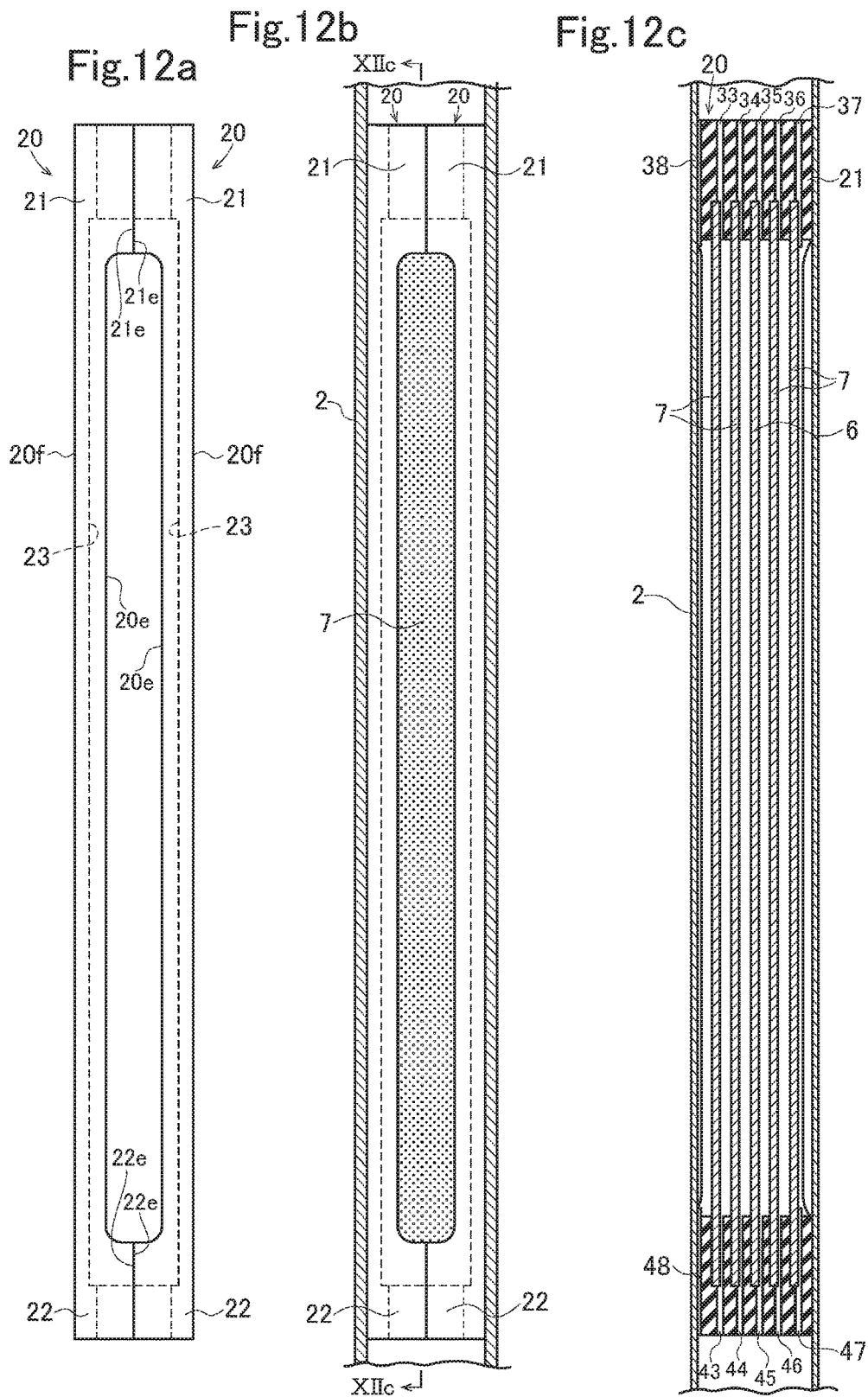
FIG. 12a is a side view of insulators illustrated in FIGS. 7a to 7c which are joined to each other.
FIG. 12b is a longitudinal cross-sectional view of an electrolysis apparatus that includes the above insulators which is taken in the vicinity of the insulators.
FIG. 12c is a cross-sectional view of the electrolysis apparatus illustrated in FIG. 12b which is taken along the line XIIc-XIIc.

An electrolysis apparatus that is the same as that used in Example 4 except that the electrolysis apparatus includes, instead of the insulators 8, insulators 20 each having the projections 21 and 22 formed in the upper and lower parts thereof as in FIG. 7 was used. An electrolysis treatment was performed as in Example 4 except the above change was made. FIG. 21 illustrates the results.

As is clear from the results shown in FIG. 21, the amount of current required for reducing the TOC concentration to 10 mg/L or less was 44 Ah/L in Example 5 where the insulators had the projections and 58 Ah/L in Example 4 where the insulators did not have the projections. This confirms that the electrolysis apparatus prepared in Example 5 which included the projections was capable of removing TOC components with higher efficiency. This is presumably because, in Example 4, a certain amount of current flowed only between the upper or lower part of the anode plate and the cathode and, accordingly, the contribution of the bipolar electrode plates on electrolysis was reduced. In contrast, in Example 5, the sides and the upper and lower edges, that is, the entire edges, of the anode plate and the bipolar electrode plates were surrounded by the insulators. This presumably prevented a current from flowing only between the upper or lower part of the anode plate and the cathode and enabled the bipolar electrode plates to be efficiently used in the electrolysis of TOC components.

Although the present invention has been described in detail with reference to particular embodiments, it is apparent to a person skilled in the art that various modifications can be made therein without departing from the spirit and scope of the present invention.

The present application is based on Japanese Patent Application No. 2014-034201 filed on Feb. 25, 2014, which is incorporated herein by reference in its entirety.

REFERENCE SIGNS LIST

1 ELECTROLYSIS APPARATUS
2 CONTAINER MAIN BODY
3 UPPER-END MEMBER
4 LOWER-END MEMBER
5 POWER SUPPLY ROD
6 ANODE PLATE
7 BIPOLAR ELECTRODE PLATE
8 INSULATOR
13 PLUG
14, 16 INSULATING MEMBER
15 PACKING
20 INSULATOR
21, 22 PROJECTION
23 to 27 GROOVE FOR SUPPORTING ELECTRODES
33 to 38, 43 to 48 CHANNEL

The invention claimed is:

1. An electrolysis apparatus comprising:
a cylindrical container main body including an inner peripheral surface serving as a cathode surface;
an anode plate disposed in the container main body along an axis of the container main body;
a bipolar electrode plate disposed in the container main body, the bipolar electrode plate being arranged parallel to the anode plate;
an insulator supporting a side of the anode plate and a side of the bipolar electrode plate, the insulator extending along the inner peripheral surface of the container main body; and
end members attached to respective ends of the container main body by being screwed,
each of the end members having a hole formed therein through which a liquid is passed,
one of the end members being provided with a power supply rod inserted therein, the power supply rod being connected to the anode plate.

2. The electrolysis apparatus according to claim 1, wherein the insulator includes an outer peripheral surface that faces the inner peripheral surface of the container main body and an electrode-facing surface located on a side of the insulator which is opposite to a side of the insulator on which the outer peripheral surface is located, the electrode-facing surface having a groove formed therein in which an edge of the side of the anode plate and an edge of the side of the bipolar electrode plate are fit.

3. The electrolysis apparatus according to claim 2, wherein a pair of the insulators are arranged along the respective sides of the anode plate and the respective sides of the bipolar electrode plate.

4. The electrolysis apparatus according to claim 3, wherein each of the insulators includes projections protruded toward upper edges of the anode plate and the bipolar electrode plate and lower edges of the anode plate and the bipolar electrode plate, respectively,
each of the projections having a groove formed therein in which upper or lower edges of the anode plate and the bipolar electrode plate are fit, the groove being used for supporting electrodes,
each of the projections having a channel formed therein, the channel vertically penetrating through the projection.

5. The electrolysis apparatus according to claim 4, wherein the channel is a grooved channel communicated with the groove used for supporting electrodes.

6. The electrolysis apparatus according to claim 4, wherein the projections of one of the pair of the insulators are each in contact with a corresponding one of the projections of the other of the pair of the insulators.

7. The electrolysis apparatus according to claim 1, wherein an entirety of the bipolar electrode plate is composed of conductive diamond, or the bipolar electrode plate is constituted by a base material composed of at least one selected from a metal and a non-metal and by a coating layer composed of conductive diamond, the coating layer covering a surface of the base material.

8. A water treatment method, comprising:
passing wastewater through an electrolysis apparatus comprising
a cylindrical container main body including an inner peripheral surface serving as a cathode surface;
an anode plate disposed in the container main body along an axis of the container main body;
a bipolar electrode plate disposed in the container main body, the bipolar electrode plate being arranged parallel to the anode plate;
an insulator supporting a side of the anode plate and a side of the bipolar electrode plate, the insulator extending along the inner peripheral surface of the container main body; and
end members attached to the respective ends of the container main body by being screwed,
each of the end members having a hole formed therein through which a liquid is passed,
one of the end members being provided with a power supply rod inserted therein, the power supply rod being connected to the anode plate.

9. The water treatment method according to claim 8, wherein the wastewater is passed upwardly through the electrolysis apparatus, and a voltage is applied between the anode plate and the container main body in order to heat the wastewater by Joule's heat in the container main body and oxidatively decompose a reducing substance contained in the wastewater on a surface of the anode plate and, when the electrolysis apparatus includes the bipolar electrode plate, also on a surface of the bipolar electrode plate.

* * * * *